Oct. 30, 1951  M. M. POWERS ET AL  2,573,355
PRODUCTION OF GYPSUM WALLBOARD
Filed Feb. 18, 1950  3 Sheets-Sheet 1

*INVENTORS*
MICHAEL M. POWERS
CLARENCE J. LOECHL
BY
ATTORNEY

Oct. 30, 1951  M. M. POWERS ET AL  2,573,355
PRODUCTION OF GYPSUM WALLBOARD
Filed Feb. 18, 1950  3 Sheets-Sheet 2
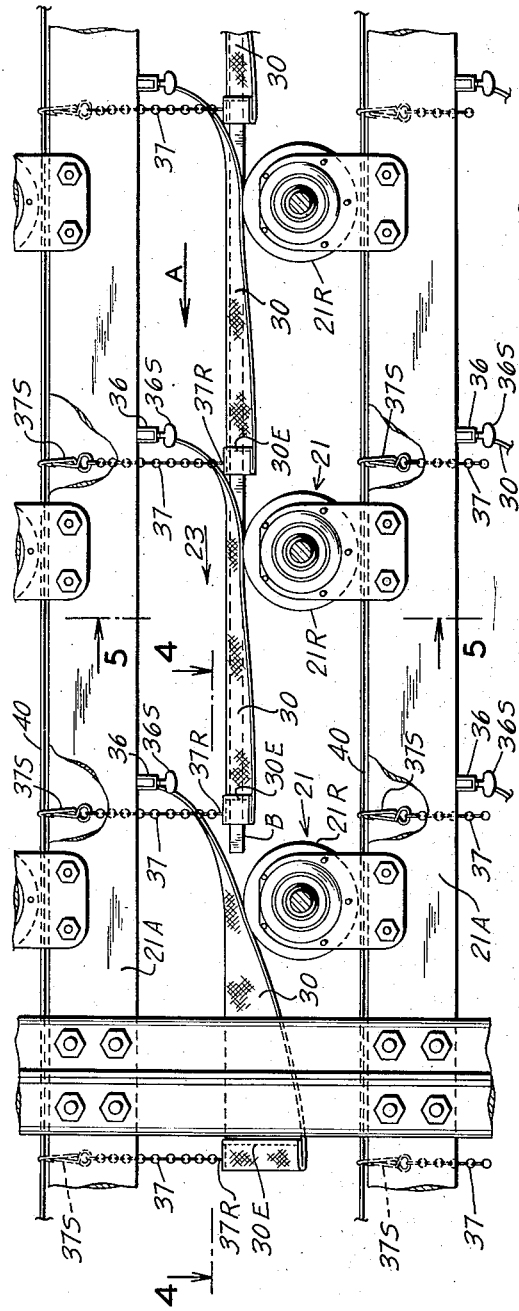
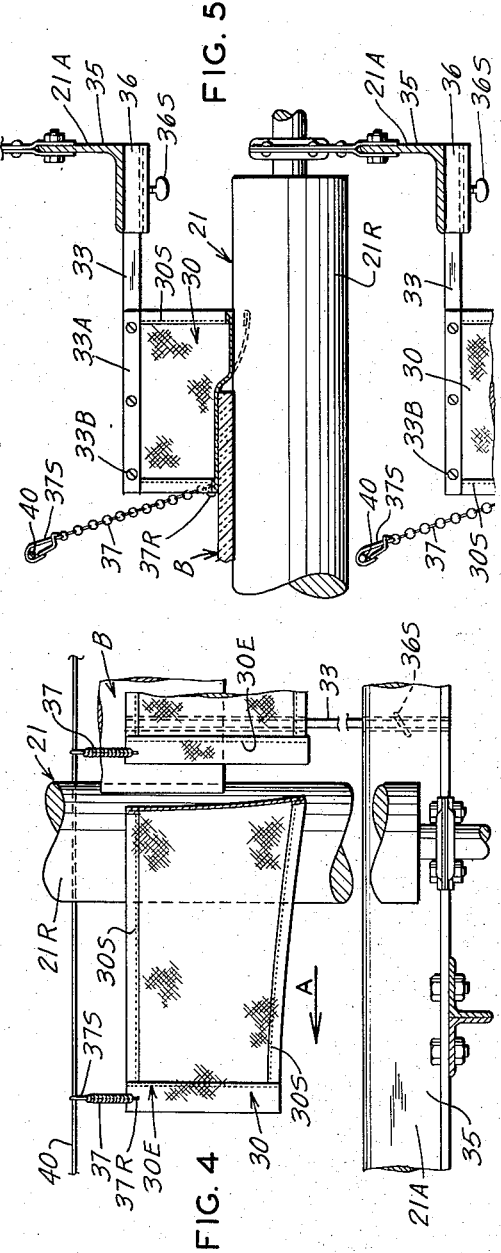
INVENTORS
MICHAEL M. POWERS
CLARENCE J. LOECHL
BY
ATTORNEY

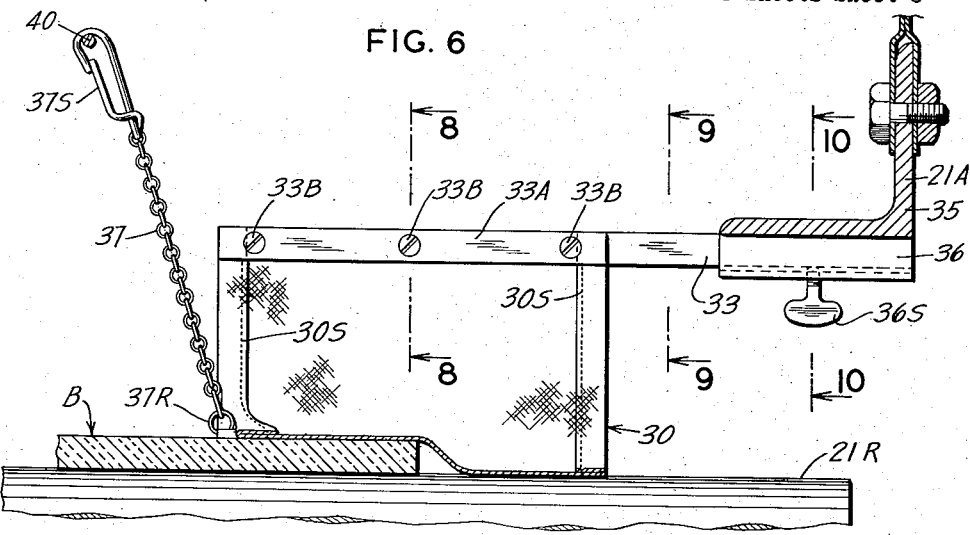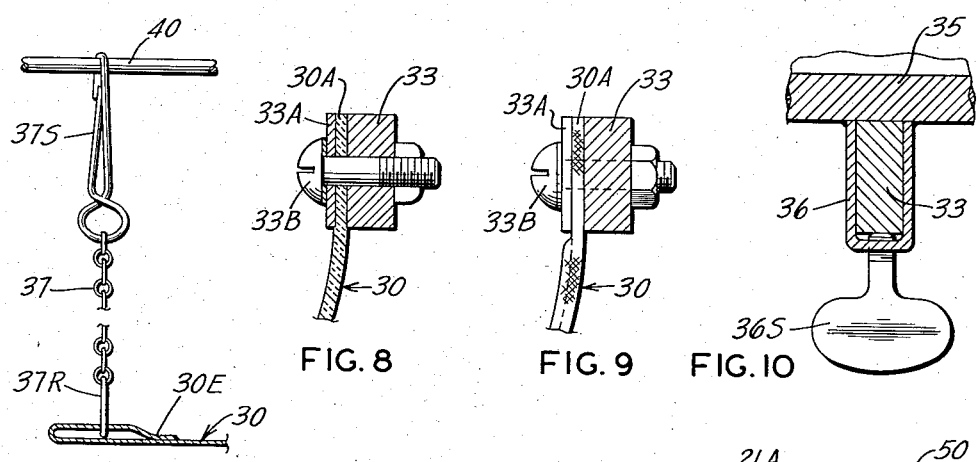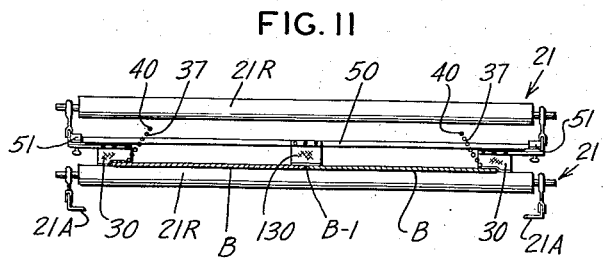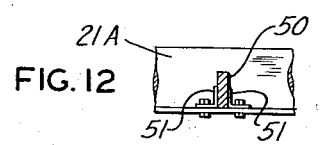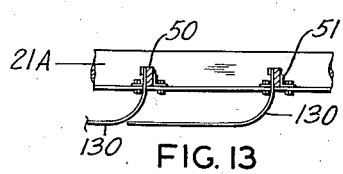

UNITED STATES PATENT OFFICE 2,573,355

PRODUCTION OF GYPSUM WALLBOARD

Michael M. Powers and Clarence J. Loechl, Chicago, Ill., assignors to Certain-teed Products Corporation, Ardmore, Pa., a corporation of Maryland Application February 18, 1950, Serial No. 144,952

2 Claims. (Cl. 34—148)

This invention relates to the production of gypsum wallboard.

In the production of gypsum wallboard, the recognized manufacturing procedure involves depositing the wet gypsum material between two paper liners, passing these liners between rolls that determine and equalize the thickness of the board, allowing setting for gypsum of the board, cutting the continuous strip of material into predetermined lengths, and then passing these individual boards endwise through a drying oven or kiln on single or multiple decked roller conveyors so that the heated air may be blown across and about both the upper and lower faces of the board to dry the same.

In order to attain maximum output or production of gypsum wallboard, such drying operation is performed at a relatively rapid rate with the temperature and humidity of the drying air such that the gypsum may be calcined by such drying air in the event that the drying operation is continued for too long a period. There is a tendency that has been long recognized in the trade for the plaster in the border areas along the edge portions of the board to be at least partially calcined in the course of the drying operation, so that in these bordering edge portions it is often found that adequate structural strength is not attained, and the soft edges are often unable to withstand handling, shipping and installation. As a result of this undesired impairment in the strength and hardness of the border portions of such gypsum wallboard, it is necessary in operating a wallboard plant to constantly check the edge portions of the boards and to regulate the temperatures of the air supply so as to minimize the undesired calcination of such border portions. This problem has been recognized for many years, and efforts have been made by means of stationary sheet metal baffles within the kiln to control the flow of drying air so as to attain uniformity of drying. These efforts, however, have been found to be ineffective in a practical sense, and there has been no satisfactory solution heretofore which would cause the drying operation to be attained in such a way as to maintain high production speed while at the same time avoiding calcination of the edge portions of the board, and to enable this desirable result to be accomplished is the primary object of the present invention.

More specifically, it is an object of the present invention to enable control of the drying operations to be attained in such a way that the board is dried at substantially the same rate throughout its entire width, and a related object is to enable the drying in the edge portions of the board to be retarded and equalized in respect to the drying action in the central portions of the board. Other and related objects are to shield border portions of the board as it advances through the drying kiln so that drying will be retarded in such border portions, and to accomplish such shielding action by means that are of a simple character and which will not in any way interfere with or be broken by jamming of the boards in the kiln. More specifically, it is an object of the present invention to shield the border portions of the board in a conveyor by flexible means that are arranged to ride on the upper border portions of the board with a blanketing effect while being bendable in an upward direction in the event that a jam of boards in the conveyor is encountered. It is also an object of the present invention to support such flexible shielding devices within the kiln and in proper relation to the conveyors in such a way that these flexible shielding elements are properly located and positioned at all times with respect to the boards and are nevertheless readily removable in the event that this is necessary.

Other and further objects of the present invention will be apparent from the following description and claims and are illustrated in the accompanying drawings which, by way of illustration, show a preferred embodiment of the present invention and the principle thereof and what we now consider to be the best mode in which we have contempltaed applying that principle. Other embodiments of the invention embodying the same or equivalent principle may be used and structural changes may be made as desired by those skilled in the art without departing from the present invention and the purview of the appended claims.

In the drawings:

Fig. 3 is a fragmentary side elevational view of the frame and conveyor structures included in the kiln;

Fig. 4 is a fragmentary plan section taken substantially along the line 4—4 of Fig. 3;

Fig. 5 is a fragmentary vertical sectional view taken substantially along the line 5—5 of Fig. 3;

Fig. 6 is an enlarged vertical sectional view similar to Fig. 5 and illustrating further details of structure;

Fig. 7 is a fragmentary detail illustrating an element of the structure;

Figs. 8, 9 and 10 are fragmentary vertical sectional views taken, respectively, along the lines 8—8, 9—9 and 10—10 of Fig. 6;

Fig. 11 is a fragmentary transverse sectional view taken through the kiln and illustrating the full width of the conveyor and the shielding means associated therewith;

Fig. 12 is a fragmentary sectional view illustrating the mounting of the cross bars that support the central shielding elements; and Fig. 13 is a view similar to Fig. 12 and illustrating the way in which the central shields are supported from the transverse supporting rods.

For purposes of disclosure, the invention is herein illustrated as embodied in a drying kiln 20 that is sectional in character and which embodies sections 20A, 20B and 20C. This kiln is arranged at the output end of a conventional wallboard forming apparatus (not shown) whereby wallboards B, embodying the gypsum core and top and bottom paper liners, are formed and cut in the usual manner, and the kiln has a plurality of horizontally disposed roller conveyors 21 arranged one above the other so that the kiln may be described as being a multiple deck kiln in that wallboard B may be passed through the kiln on any or all of the several conveyors 21. The wallboard B may, of course, be passed through each deck in a single line so that both edges are exposed, or where the kiln is relatively wide, two lines of wallboard B may be passed through side by side, as shown in Fig. 11, so the adjacent edges are abutted and only the outer edges are exposed. These roller conveyors 21, Fig. 11, are of identical construction and each conveyor embodies a series of transversely positioned spaced rollers 21R supported on frames including horizontal angles 21A, such rollers being driven in unison by conventional drive gearing so as to move the wallboard through the kiln 20 in an advancing direction indicated by the arrow A.

Figure 1:
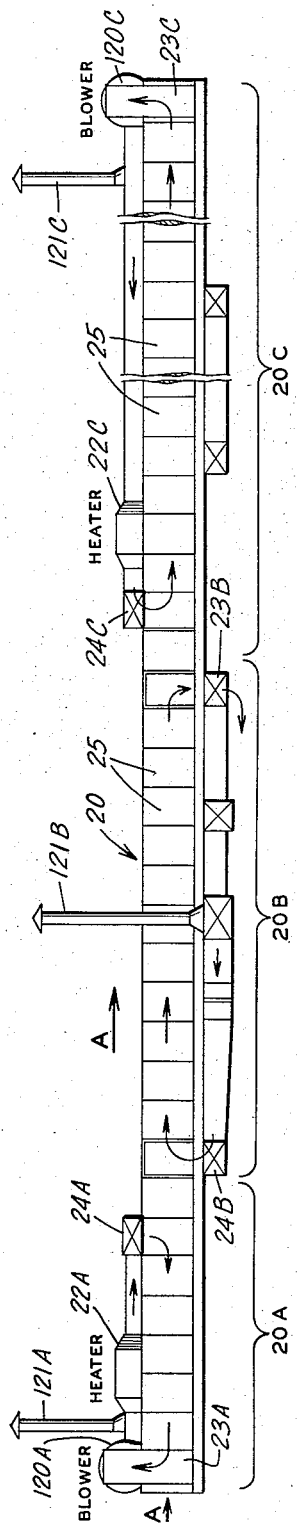
Fig. 1 is a side elevational view of a drying kiln of the kind in which the present invention may be embodied.

It will be observed that the individual sections 20A, 20B and 20C of the drying kiln are arranged so that heated drying air may be supplied individually to the respective sections, thereby to enable the drying air to be maintained at different temperatures in the different sections of the kiln. Thus, as will be evident in Fig. 1 of the drawings, the respective kiln sections are provided with heated air supply units 22A, 22B and 22C that are arranged to discharge high velocity heated air either in the advancing direction A, as in the case in respect to the sections 20B and 20C, or in a reverse or counter-motion direction, as is the case in respect to the kiln section 20A, and at the opposite ends of each section exhaust manifolds 23A, 23B and 23C, and return manifolds 24A, 24B and 24C are arranged. The kiln sections 20A, 20B and 20C have blower units 120A, 120B and 120C associated therewith to draw air from the respective kiln sections through respective exhaust manifolds 23A, 23B and 23C, and the air from the respective blowers is forced through the related heater and then to the return manifolds 24A, 24B and 24C. Preferably, exhaust stacks 121A, 121B and 121C are afforded between the respective blowers and heaters so that a portion of the air will be discharged, thereby to reduce the humidity of the recirculated drying air.

The kiln sections 20A, and 20B and 20C are of conventional construction so as to afford removable doors 25 along the sides thereof so that these doors 25 may be removed when an improper feeding action in the kiln produces a jam of boards between the conveyors.

The advancing speed of the conveyors 21 in the direction A, and the temperature and velocity of the air supply by the heaters 22A, 22B and 22C are, in a theoretical sense, so related that proper drying of the major portions of the board will be attained, but the attainment of this result without undesired calcination of border portions of the boards B along the edges thereof is known to be extremely difficult and in a practical sense impossible under known methods of control. Under and in accordance with the present invention, however, means are afforded within the kiln to govern and control the drying action so that the aforesaid undesirable calcination of border portions of the boards B will be avoided. In attaining this result, the border portions of the boards B are shielded and blanketed against the moving drying air, and this is done in such a way that the shielding means will not be broken or destroyed in the event that a jam of boards is encountered on any one of the conveyors 21, and these shields are of such a character that they will not of themselves tend to induce such jams.

Thus, along each border portion of each conveyor, a plurality of flexible shield elements, or blankets 30 are mounted, these shield elements being formed from a flexible heat resistant material such as glass fibre or woven asbestos fabric; it being desirable where asbestos fabric is employed to use fabric that is formed primarily from long fibre asbestos, so as to increase the wearing and strength characteristics. These flexible heat resistant shields or blanket members 30 are preferably about seven inches in width and about eighteen inches in length, and are formed with seams 30S along the side edges thereof, and with an end seam 30E along one end which constitutes what may be termed a trailing end of the flexible shield member 30. These seams are preferably formed with a heat resistant thread such as fibre glass thread. The other end of the shield member 30 may be termed an anchoring end 30A, and by reason of the nature of the anchoring arrangement herein shown, the anchoring edge 30A need not be seamed. Such anchoring arrangement, as shown in Figs. 3 to 6 and 8 and 9 comprises a projecting arm 33 that is rigidly related to the conveyor frame 35, and one such arm 33 is afforded for each of the flexible shield members 30. Each arm 33 has a clamping or securing means associated therewith, and in the present instance such means are afforded by clamping bars 33A and clamping screws 33B. The arms 33 are individually mounted in U-shaped brackets 36 on the lower flanges of the frame angles 21A, and the arms are held in place by thumb screws 36S. These arms 33 are located a substantial distance above the upper edges of the rolls 21R, and the spacing of the supports 33 from each other is such that when the shields 30 are allowed to extend downwardly and in the aforesaid advancing direction A, each shield 30 will extend for such a distance that its trailing end 30E will be located relatively close to a portion of the succeeding blanket 30.

The shields or blankets 30 are arranged in a lateral sense so that when the wallboard B is passed through the kiln, about 3" to 6" of the border portion of the board will be disposed beneath the blankets 30, and it will be observed that this affords an additional projection of the blankets B beyond the edges of the board, so that this projecting portion of the shields 30 hangs down slightly in an angular direction across the edge of the board without actually contacting such edge, and the remaining portion of this projecting part of the shield is extended laterally in a substantially horizontal position and at about the level of the upper faces of the rolls 21R. This form and location of the shields 30 serves as insulation for the border portions and edges of the boards from the sensible heat from the kiln structure, and at the same time prevents flow of the drying air over and about the edges of the boards.

Since the shields 30 are flexible in character, and since there may be some variation in the forces acting on the shields or in the way in which these individual shields 30 are clamped on the supports 33, means are afforded for insuring accurate tracking of the shields, particularly, insofar as the trailing end edges 30E may be concerned. In attaining this result, a downwardly extended flexible member 37 is provided for each shield 30, and is attached at its lower end to the shield by means of a ring 37R that extends through the upper thickness only of the hem at the trailing edge 30E, this point of attachment being at what may be termed the inner edge of he shield 30 so that the ring in effect extends about the end edge of the hem. This flexible member 37 is preferably in the form of a flexible chain which will withstand the heat of the drying kilns, and the upper end of each such flexible member 37 is anchored in such a relation that the flexible member 37 of any particular shield 30 may extend upwardly past the inner side edge of the next shield 30 in the advancing direction 23. In the present instance, the anchoring means for the upper ends of the flexible members 37 is afforded by a longitudinally extending wire 40 that is mounted on the frame 35 of the conveyor, a substantial distance above the anchoring members 33, and each chain has a snap fastener 37S on its upper end which is snapped over the related wire 40.

With the shields 30 in position as above described, it will be clear that the high velocity air that moves through the kiln, and which air, of course, must finally move laterally so as to be discharged from the kiln into exhaust manifolds 24, will not move in direct contact with the upper border portions of the board that are shielded or blanketed by the shields 30, and this high velocity air is prevented by the projecting edges of the shields 30 from sweeping down across the side edges of the board Thus, the drying action is materially retarded in this border portion, and the free moisture content of the edge or border portions of the boards is maintained substantially the same as in the center portions of the board, and thus undesired calcination of these border portions of the board will be prevented even though the temperature of the drying air may be far in excess of the calcining or decomposition temperature of gypsum.

Figure 2:
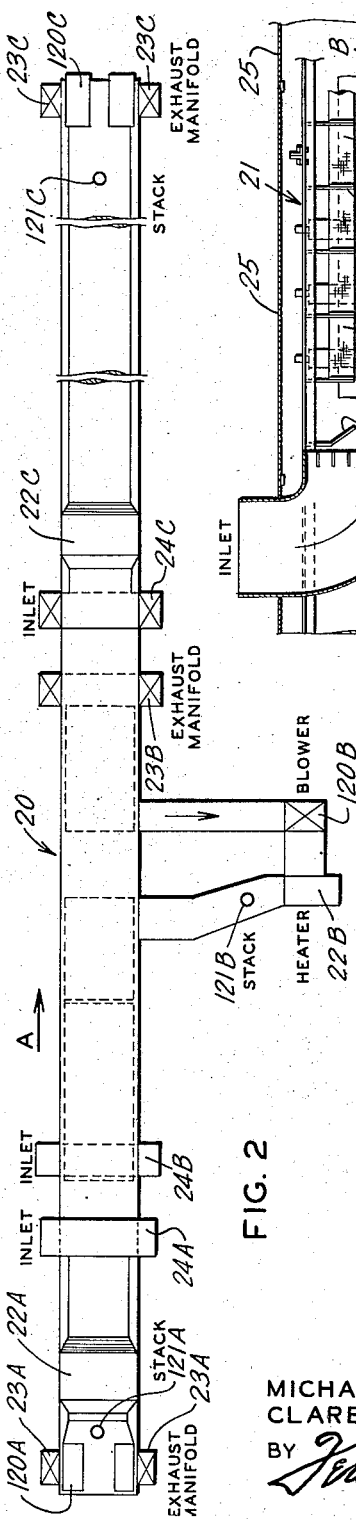
Fig. 2 is a plan view of the kiln.
Figure 2A:
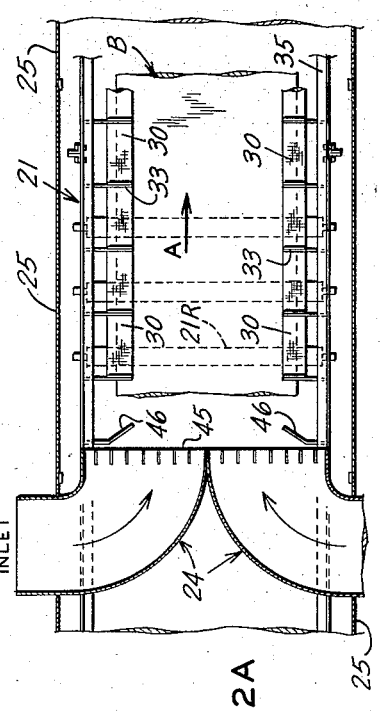
Fig. 2A is a fragmentary plan sectional view illustrating a deflector mechanism that is employed.

The heated drying air is discharged longitudinally into the kilns adjacent to the inlet ducts 24 by a plurality of longitudinally directed nozzles 45 that are disposed adjacent to each deck of the conveyor system, and this structure, although well known in the art, is schematically illustrated in Fig. 2A of the drawings. Since the drying air is discharged longitudinally of the kiln at a relatively high velocity from the nozzles 45, there is a tendency in some instances to undesirably displace the flexible blankets or shields 30, and to avoid this, a plurality of deflecting baffles 46 are supported as indicated in Fig. 2A so as to deflect the discharge air from direct impact on the shields 30 that are suspended adjacent to such nozzles 45.

As hereinbefore pointed out, the relative width of the kiln and the conveyors 21 has a definite bearing upon the arrangement in which the boards B are passed through the kiln, and in many instances, it is common practice to pass two lines of boards B longitudinally through the kiln so that the adjacent edges B-1 thereof will be relatively close together as shown in Fig. 11. So long as these edges are maintained in substantial contact one with the other, the border portions of the boards adjacent to the edges B-1 will not be objectionably calcined in the course of the board drying operation, but in those instances where it is difficult to assure contact of the adjacent edges B-1, the adjacent border portions of the two lines of boards may be blanketed in the manner hereinbefore described in respect to the shields 30. Thus, as shown in Figs. 11, 12 and 13, a plurality of cross rods 50 are supported between locating brackets 51 that are disposed on the upper faces of the angle members 21A which support the conveyor rolls 21R, and the cross bars 50 have blankets or shields 130 connected thereto, and extended downwardly therefrom, in the same manner as hereinbefore described with respect to the shields 30. The location of the shields 130 on the rods 50 is arranged so that these shields will be centered upon the theoretical location of the edges B-1 of the boards. Thus, the border portions of the boards adjacent to the edges B-1 will be blanketed, and the drying in these border portions will be retarded in the same manner as hereinbefore described with respect to the shields 30. In respect to the shields 130, however, the retarding action that is imposed upon the drying operation by the closeness or adjacent relationship of the two edges B-1, materially reduces the need for the shields or blankets 130, and hence, in respect to these blankets 130, the number of shields 130 may be materially reduced or the spacing of the shields 130 longitudinally of the kiln may be increased substantially. Thus, it is found that where the border portions of the boards adjacent to the edges B-1 are maintained in substantial contact and are blanketed or covered through, for example, one-half of the length of the kiln, the resulting drying operation will attain substantial uniformity in all of the portions or areas of the boards B.

From the foregoing description, it will be apparent that the present invention materially simplifies the drying of gypsum wallboard and the like, and assures that uniformity of product will be attained. It will also be evident that by reason of such uniformity of drying, the structural strength in such boards will be uniform. Under and in accordance with the present invention, this uniformity of drying is attained by means which will not of themselves tend to create jams of boards within the kiln, and yet if such jams occur, the blanketing or shielding means may be readily and easily removed so as to facilitate removal of the damaged boards.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a drying apparatus for wallboard, an elongated drying kiln, a conveyor mounted in said kiln and along which wallboard may be moved in a horizontal position longitudinal of said kiln, a plurality of individual heat resistant flexible blanket members each having an anchoring end and a trailing end, anchoring means at spaced intervals along said conveyor and spaced upwardly therefrom, means securing the anchoring ends of said blanket members to said anchoring means to suspend said members within said kiln and over said conveyor in position to ride along the upper bordering surfaces of such wallboard as the wallboard is advanced through said kiln by said conveyor so as to thereby retard drying on the border portions of the wallboard, and flexible guide elements connected to the trailing ends of said blanket members, and extended upwardly past adjacent side edges of adjacent blanket members to guide and insure proper tracking of said blanket members.

2. In a drying apparatus for wallboard, an elongated drying kiln, a conveyor including a rigid frame and mounted in said kiln and along which wallboard may be moved in a horizontal position longitudinal of said kiln, a plurality of rigid mounting arms removably mounted on said frame at spaced intervals along said conveyor and spaced upwardly therefrom, a plurality of individual heat-resistant flexible blanket members each having an anchoring end and a trailing end, means securing the anchoring ends of said blanket members to said arms to suspend said members within said kiln and over said conveyor in position to extend downwardly onto and along the upper bordering surfaces of such wallboard as the wallboard is advanced through said kiln by said conveyor so as to blanket such bordering surfaces and thereby retard drying on the border portions of the wallboard, and flexible guide elements connected to the trailing ends of said blanket members and extended upwardly past adjacent side edges of adjacent blanket members to guide and insure proper tracking of said blanket members.

MICHAEL M. POWERS.
CLARENCE J. LOECHL.

REFERENCES CITED

The following references are of record in the file of this patent:

UNITED STATES PATENTS

| Number | Name | Date |
|---|---|---|
| 1,206,594 | Rihl | Nov. 28, 1916 |
| 1,214,234 | Skinner | Jan. 30, 1917 |
| 1,730,629 | Rule | Oct. 8, 1929 |
| 1,975,687 | Grabill | Oct. 2, 1934 |